United States Patent
Thorson et al.

(10) Patent No.: US 9,682,441 B2
(45) Date of Patent: Jun. 20, 2017

(54) LASER POLISHING SYSTEM AND METHOD FOR METAL FACE SEAL

(71) Applicant: Caterpillar Inc., Peoria, IL (US)

(72) Inventors: Timothy Thorson, Morton, IL (US); Thierry Andre Marchione, Heber City, UT (US); Daniel P. Vertenten, Aurora, IL (US); Dennis Turczyn, Edelstein, IL (US)

(73) Assignee: Caterpillar Inc., Peoria, IL (US)

( * ) Notice: Subject to any disclaimer, the term of this patent is extended or adjusted under 35 U.S.C. 154(b) by 200 days.

(21) Appl. No.: 14/727,028

(22) Filed: Jun. 1, 2015

(65) Prior Publication Data
US 2016/0346871 A1    Dec. 1, 2016

(51) Int. Cl.
*B23K 26/00* (2014.01)
*B23K 26/06* (2014.01)
*B23K 26/08* (2014.01)

(52) U.S. Cl.
CPC ...... *B23K 26/0075* (2013.01); *B23K 26/0081* (2013.01); *B23K 26/0604* (2013.01); *B23K 26/0626* (2013.01); *B23K 26/0869* (2013.01)

(58) Field of Classification Search
CPC ............ B23K 26/0075; B23K 26/0081; B23K 26/0604; B23K 26/0626; B23K 26/0869
USPC ............ 219/121.62–121.72, 121.76, 121.77, 219/121.83, 121.85
See application file for complete search history.

(56) References Cited

U.S. PATENT DOCUMENTS

| | | | |
|---|---|---|---|
| 4,505,485 A | 3/1985 | Hirakawa | |
| 5,404,678 A * | 4/1995 | Hasegawa | B24B 9/065 451/180 |
| 5,951,892 A | 9/1999 | Wolfla et al. | |
| 6,135,861 A * | 10/2000 | Schaack | B24B 35/00 451/243 |
| 8,360,436 B2 | 1/2013 | Teshima et al. | |
| 8,689,907 B2 | 4/2014 | Lu | |
| 2015/0029485 A1* | 1/2015 | Lafarre | G03F 7/70416 355/72 |
| 2015/0192532 A1* | 7/2015 | Clevenson | G01R 33/323 324/304 |
| 2015/0272676 A1* | 10/2015 | Hasenberg | A61B 18/22 606/15 |

FOREIGN PATENT DOCUMENTS

EP    2740974 A1    6/2014

* cited by examiner

*Primary Examiner* — Samuel M Heinrich
(74) *Attorney, Agent, or Firm* — Baker Hostetler

(57) ABSTRACT

A laser polishing method for a metal face seal is provided. The method includes determining, using a processor, a first smoothness level of a seal face surface of the metal face seal. The method includes applying, using the processor, a laser beam at a first angle to at least one peak on the seal face surface of the metal face seal, the first angle measured relative to a normal to the seal face surface. The method includes determining, using the processor, a second smoothness level of the seal face surface. The method includes controlling, using the processor, the laser beam until the second smoothness level is equal to a threshold smoothness level. The method includes turning off the laser beam, using the processor, when the second smoothness level is equal to the threshold smoothness level isotropically over the seal face surface.

20 Claims, 7 Drawing Sheets

LASER POLISHING SYSTEM AND METHOD FOR METAL FACE SEAL

TECHNICAL FIELD

This patent disclosure relates generally to metal face seals, and more particularly, to a laser polishing system and method for a metal face seal.

BACKGROUND

Metal face seals have a ring like shape. Conventionally, metal face seals are polished manually and mechanically with a goal to provide a smooth surface (similar to that of a bearing). Current processes to achieve this goal include a lapping process followed by a manual or mechanical polishing process. At the end of such conventional processes, the metal face seals tend to have a circumferential or directional smoothness with substantial variability in smoothness within a single metal face seal, as well as inconsistency in a desired level of smoothness from one seal to another. Further, such circumferentiality may lead to asymmetric degradation in smoothness as the metal face seal is used in a machine, causing leaks in one direction. Furthermore, the mechanical polishing leads to a substantial loss of material of the metal face seal.

U.S. Pat. No. 8,250,757 ('757 patent) discloses laser surface treatment for mechanical seal faces. The '757 patent uses a seal ring machining equipment that has a laser unit that forms micro-topography depth features in the seal face and then performs a material surface treatment process to selectively alter the conductivity of the seal face seal face so as to virtually eliminate electro-corrosion in the seal rings. The '757 patent discloses using multiple passes of a 248 nm excimer laser for creating circumferentially spaced apart features (grooves) with variable depth in one or more directions. However, such mechanical face seals have applications different from those of metal face seals, and the circumferentiality of the polishing process has drawbacks, such as inconsistent and directional polishing of the ring surface, especially with respect to metal face seal applications.

Accordingly, there is a need to resolve these problems and other problems related to conventional methods and systems used for smoothening and polishing metal face seals.

SUMMARY

In one aspect of this disclosure, a laser polishing method for a metal face seal is provided. The method includes determining, using a processor, a first smoothness level of a seal face surface of the metal face seal. The method includes applying, using the processor, a laser beam at a first angle to at least one peak on the seal face surface of the metal face seal, the first angle measured relative to a normal to the seal face surface. The method includes determining, using the processor, a second smoothness level of the seal face surface. The method includes controlling, using the processor, the laser beam until the second smoothness level is equal to a threshold smoothness level. The method includes turning off the laser beam, using the processor, when the second smoothness level is equal to the threshold smoothness level isotropically over the seal face surface.

In another aspect of this disclosure, a laser polishing system for a metal face seal is provided. The laser polishing system includes a metal face seal positioned on a rotatable base; a laser source configured to apply a laser beam at a first angle to at least one peak on a seal face surface of the metal face seal, the first angle measured relative to a normal to the seal face surface; and a processor. The processor is configured to determine a first smoothness level of the seal face surface, determine a second smoothness level of the seal face surface after the laser beam has been applied to the seal face surface, control the laser beam until the second smoothness level is equal to a threshold smoothness level; and turning off the laser beam when the second smoothness level is isotropically equal to the threshold smoothness level over the seal face surface.

In yet another aspect of this disclosure, a non-transitory computer readable medium comprising computer executable instructions for laser polishing of a metal face seal is provided. The computer executable instructions when executed by a processor cause the processor to determine a first smoothness level of a seal face surface of the metal face seal; apply a laser beam at a first angle to at least one peak on the seal face surface of the metal face seal, the first angle measured relative to a normal to the seal face surface; determine a second smoothness level of the seal face surface; control the laser beam until the second smoothness level is equal to a threshold smoothness level; and turn off the laser beam when the second smoothness level is equal to the threshold smoothness level isotropically over the seal face surface.

DETAILED DESCRIPTION

Various aspects of this disclosure are related to addressing the problems in the conventional laser polishing systems and methods, particularly with respect to metal face seals or floating seals. Various aspects of this disclosure provide specific details of laser polishing of metal face seals leading to uniform non-circumferential and consistent smoothness of metal face seals for various applications in which such metal face seals may be used.

Figure 1:
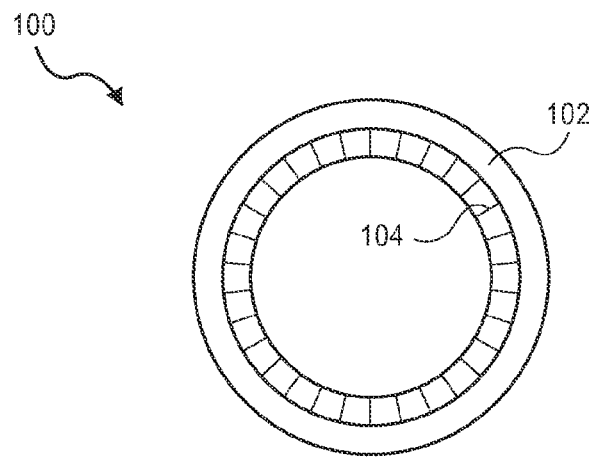
FIG. 1 illustrates a top view of a metal face seal, in accordance with an aspect of this disclosure.
Figure 2:
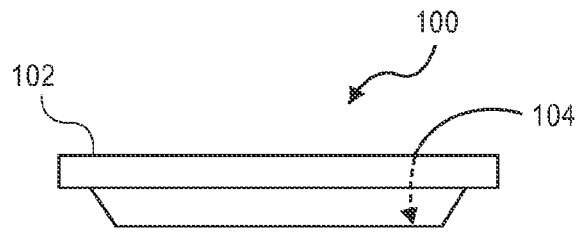
FIG. 2 illustrates a side view of the metal face seal of FIG. 1, in accordance with an aspect of this disclosure.

Now referring to the drawings, where like reference numerals refer to like elements, FIG. 1 illustrates a top view of a metal face seal 100. FIG. 2 illustrates a side view of the metal face seal 100. The metal face seal 100 includes a seal face surface 102 and a taper surface 104. The taper surface 104 may be at a predefined angle relative to the seal face surface 102. The seal face surface 102 may be an outer seal band of the metal face seal 100, which may be disposed around an outer periphery of the taper surface 104. Theoretically, the seal face surface 102 is perfectly smooth, and ideally, the seal face surface 102 may initially be rough and may be laser polished to a level of smoothness, in accordance with an aspect of this disclosure. Further, a width of the seal face surface 102 is uniform within the metal face seal 100. However, actual dimensions of the metal face seal 100 are machinable according to the specific applications in which the metal face seal 100 is utilized. Therefore, the metal face seal 100 may be manufactured in different diameters varying, for example, from a few centimeters to a few meters in diameter.

The metal face seal 100 may be interchangeably referred to as a floating seal. By way of example only and not by way of limitation, the metal face seal 100 may be a DUO CONE™ seal manufactured by Caterpillar, Inc. of Peoria, Ill. It will be appreciated by one of ordinary skill in the art that the structure and function of the metal face seal 100 is different from other types of seals, including but not limited to mechanical face seals, known to one of ordinary skill in the art. In one aspect, the metal face seal 100 includes two identical parts (of which only one is shown in FIG. 1). In use, the two identical parts of the metal face seal 100 are arranged back to back or face to face, for example, in a rotatable shaft of heavy load equipment or a machine. Such equipment in which the metal face seal 100 may be used is termed "heavy load" due to their ability to transport a payload of several hundred tons in difficult environmental conditions and terrains.

By way of example only and not by way of limitation, the metal face seal 100 may be deployed on a wheel gear unit of a machine between an engine of the machine and a wheel hub, although the metal face seal 100 may be deployed in any part of a machine where solid debris, dirt, outside particles, etc., have to be kept out but a fluid has to be kept in (e.g., oil) with zero to minimal leakage of the fluid. For example, the metal face seal 100 may be used in heavy duty rotating applications, such as in axles, gearboxes, tracked vehicles, conveyor systems, and the like, where components of a shaft are exposed to high temperatures, abrasion, high pressure, and large impulsive or steady forces. To ensure optimal functioning of the metal face seal 100, it is prudent for a manufacturer of the metal face seal 100 to have the seal face surface 102 as smooth as possible.

Figure 3:
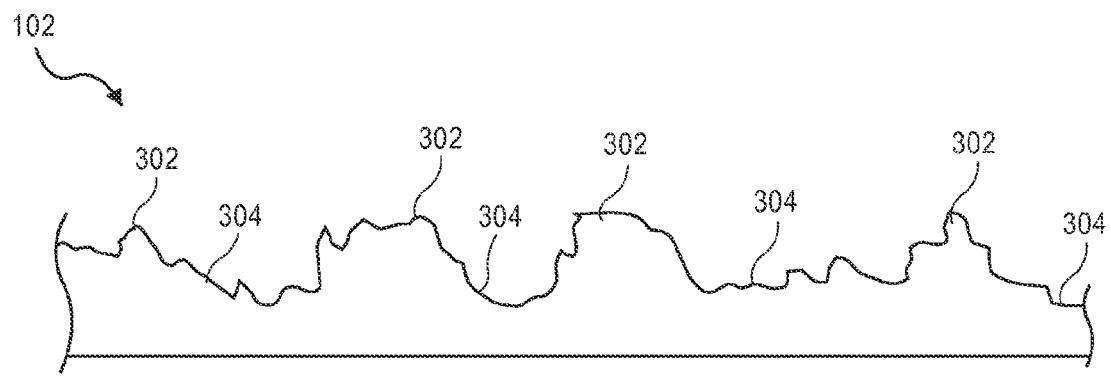
FIG. 3 illustrates a smoothness or roughness of a seal face surface/outer band of the metal face seal of FIG. 1 in a partial side view, in accordance with an aspect of this disclosure.

Referring to FIG. 3, an elevation view of the seal face surface 102 is shown in more detail, for example, when viewed magnified under a microscope. As illustrated in FIG. 3, the seal face surface 102 has a plurality of peaks 302 and a plurality of valleys 304 adjacent respective ones of the plurality of the peaks 302. It will be appreciated by one of ordinary skill in the art that a smoothness of the seal face surface 102 is directly in relation to a smaller height/depth gap between the plurality of peaks 302 and the plurality of valleys 304. An uneven distribution of the plurality of peaks 302 and the plurality of valleys 304 may cause the seal face surface 102 to have asymmetric or non-uniform roughness (or, equivalently, non-uniform smoothness). As a result, left unattended, such non-uniform smoothness of the metal face seal 100 may cause leakages of fluid more in one direction than the other. Various aspects of the disclosure address the smoothness/roughness issues caused by the plurality of peaks 302 and the plurality of valleys 304 present on the seal face surface 102.

Figure 4:
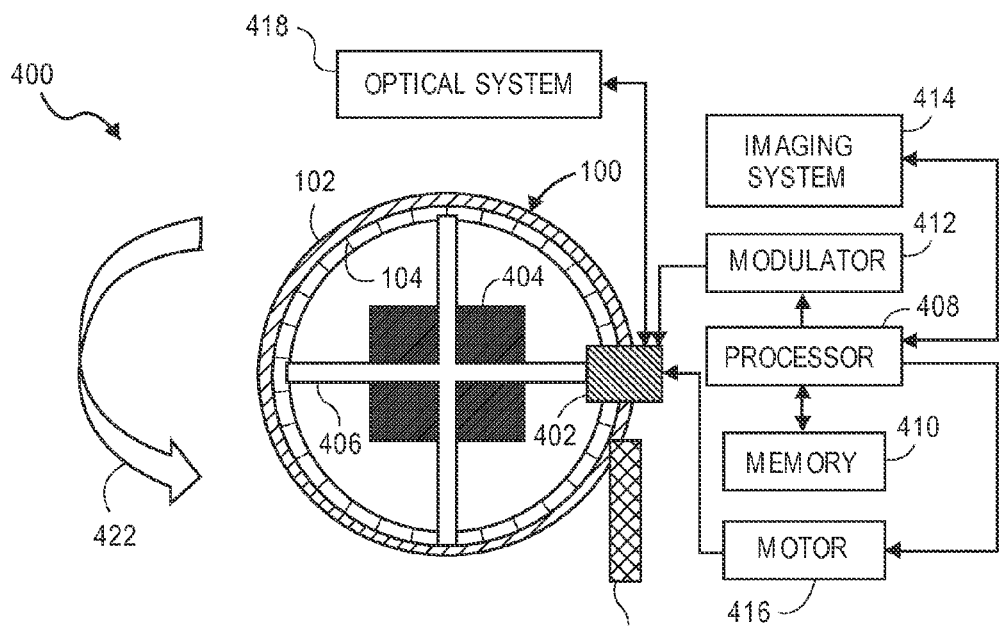
FIG. 4 illustrates a top view of a laser polishing system for the metal face seal of FIG. 1, in accordance with an aspect of this disclosure.

Referring to FIG. 4, a top view of a schematic setup for a laser polishing system 400 for the metal face seal 100 is illustrated, in accordance with an aspect of this disclosure. The laser polishing system 400 includes a laser source 402 positioned above, adjacent, or directly facing the metal face seal 100, a rotatable base 404 used to rotate the metal face seal 100, a fixture 406 supporting the metal face seal 100 on the rotatable base 404, a processor 408 coupled to a memory 410, a modulator 412, an imaging system 414, and a motor 416. The rotatable base 404 is configured to rotate the metal face seal 100 in a clockwise or an counterclockwise direction as indicated by an arrow 422. The rotatable base 404 may be rotated by one or more external motors (not shown), different from the motor 416. Alternatively, the rotatable base 404 may be replaced by a stationary base. The laser polishing system 400 may further include a shielding gas nozzle 420 and an optical system 418 including a plurality of optical components (not shown in FIG. 4).

In one aspect of this disclosure, the laser source 402 may be an excimer laser, although other types of laser sources (non-excimer) may be used by one of ordinary skill in the art, in view of this disclosure. The laser source 402 may be configured to output femtosecond pulses, although the laser source 402 may be a laser outputting smaller pulses (picosecond, attosecond, etc.) or larger pulses, and is not restricted to ultrafast pulses, as will also be appreciated by one of ordinary skill in the art in view of this disclosure. The laser source 402 may be operable in continuous as well as pulsed modes. In one aspect, the laser source 402 may be or may include an infrared wavelength laser. Further, an output of the laser source 402 may be modulated by the modulator 412. The modulator 412 may be a direct injection type modulator or may be an extrinsic output modulator (e.g., a Lithium Niobate modulator), which may be controllable further by the processor 408 to implement various modulation schemes for the laser source 402. Furthermore, the term "laser source" may not be limited to only a single laser, but may include an array of lasers, a master-slave laser arrangement, and the like, or combinations thereof.

Figure 5:
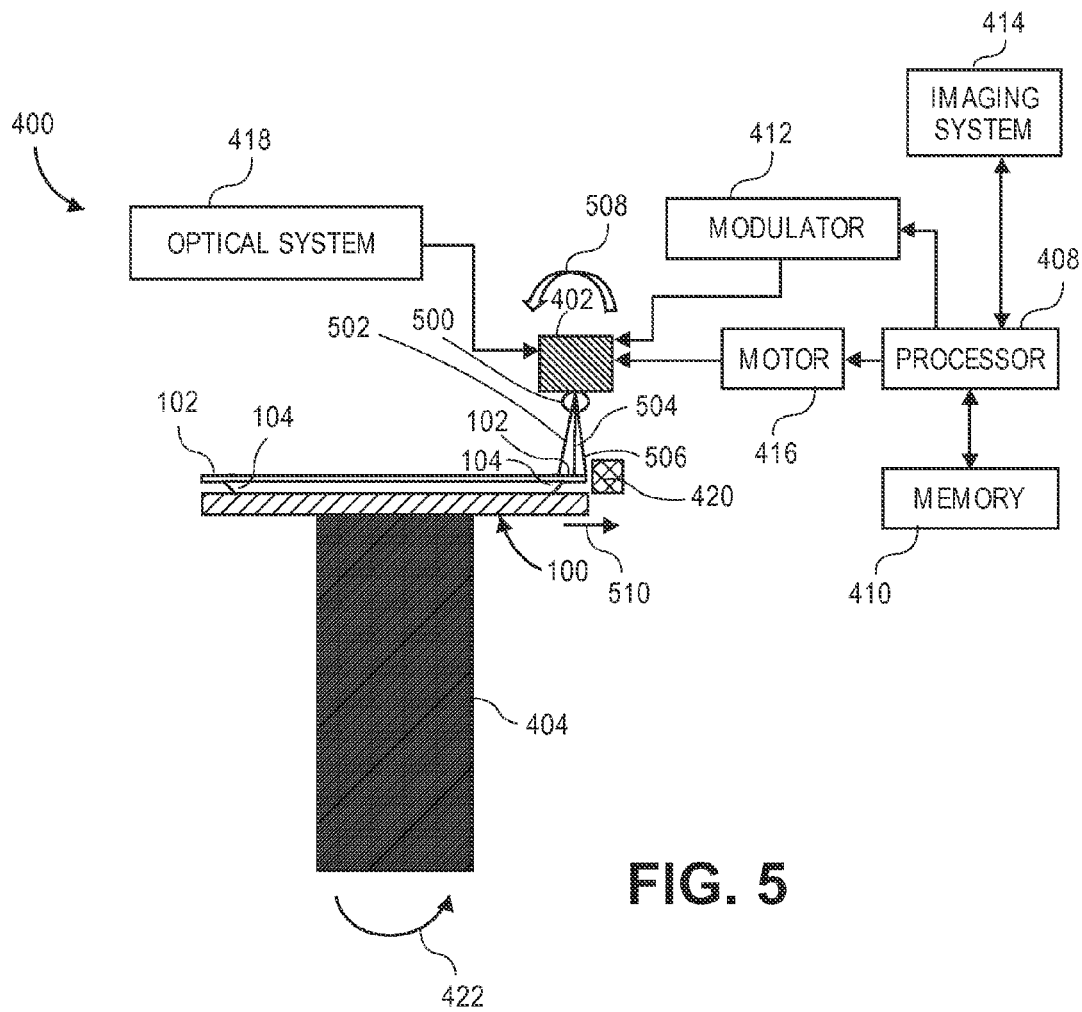
FIG. 5 illustrates a side view of the laser polishing system for the metal face seal of FIG. 1, in accordance with an aspect of this disclosure.

Referring to FIG. 5, a side view of the laser polishing system 400 is illustrated, in accordance with as aspect of this disclosure. As illustrated in FIG. 5, the laser source 402 is configured to output a laser beam 500. The laser source 402 is positioned such that the laser beam 500 is incident upon the seal face surface 102. In one aspect of this disclosure, the laser source 402 is movable and/or tiltable as indicated by an arrow 508 to output the laser beam 500 transversally along a radial direction 510 of the metal face seal 100. For example, the laser source 402 may be tiltable to a plurality of positions (discussed with respect to FIGS. 6-10) such that the laser beam 500 may be incident on the seal face surface 102 at different portions of the seal face surface 102. In FIG. 5, the laser beam 500 is illustrated to move in the radial direction 510 inward to outward, as indicated by the laser beam 500 shown successively as a first time instance 502, a second time instance 504, and a third time instance 506, by way of example only. Alternatively, the laser beam 500 may be a composite beam outputted as a plurality of laser beams by the laser source 402 at the same time instance. Further, the laser source 402 may be movable clockwise or counterclockwise over the seal face surface 102 in a direction indicated by the arrow 422 in FIG. 4. Yet alternatively, the laser source 402 may be stationary.

In one aspect, the laser source 402 may be movable and/or tiltable by the motor 416. The motor 416 may be one or more stepper motors controllable by the processor 408, although other types of motors with continuous or discrete output modes could be used (e.g., piezoelectric motors). The processor 408 may be part of a computer numerical control (CNC) machine or other computing device, including but not limited to, mobile computing devices, tablet devices, smart phones, or other types of computing and controller devices that can provide an interface to control the laser source 402. By way of example only and not by way of limitation, the processor 408 may be fabricated using a Complementary Metal Oxide Semiconductor (CMOS) fabrication technology. In one aspect, the processor 408 may be implemented as an Application Specific Integrated Circuit (ASIC), a Field Programmable Gate Array (FPGA), a System-on-a-Chip (SOC), or the like. The processor 408 may include central processing units (CPUs), graphics processing units (GPUs), holographic processing units (HPUs), and the like, or combinations thereof. In another aspect, the processor 408 may include components such as packaging, input and output pins, heat sinks, signal conditioning circuitry, input devices, output devices, processor memory components, cooling systems, power systems and the like, which are not shown in FIGS. 4 and 5, but may be contemplated by one of ordinary skill in the art in view of this disclosure.

Figure 8:
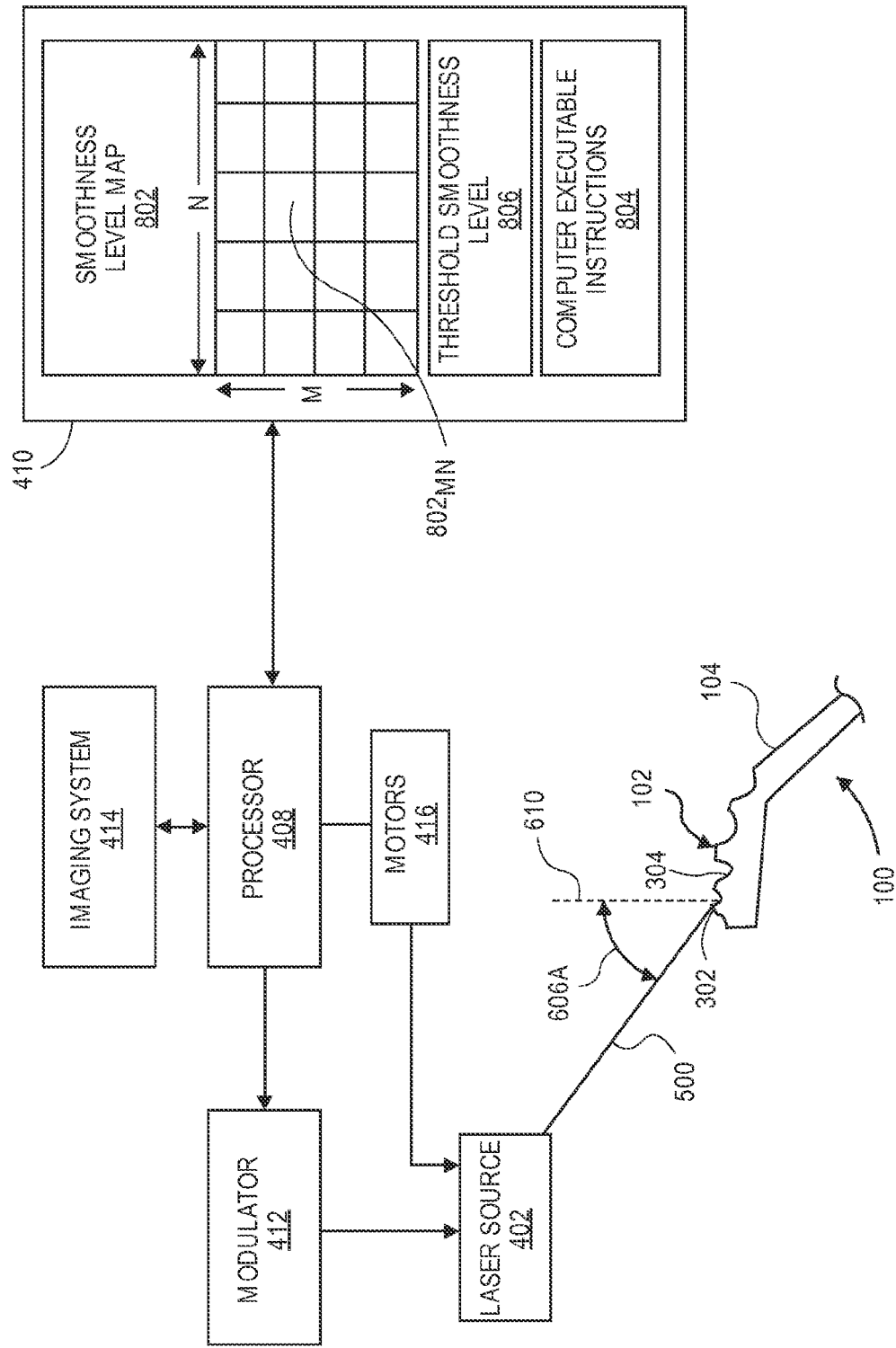
FIG. 8 illustrates a smoothness level map for the metal face seal of FIG. 1, in accordance with an aspect of this disclosure.
Figure 9:
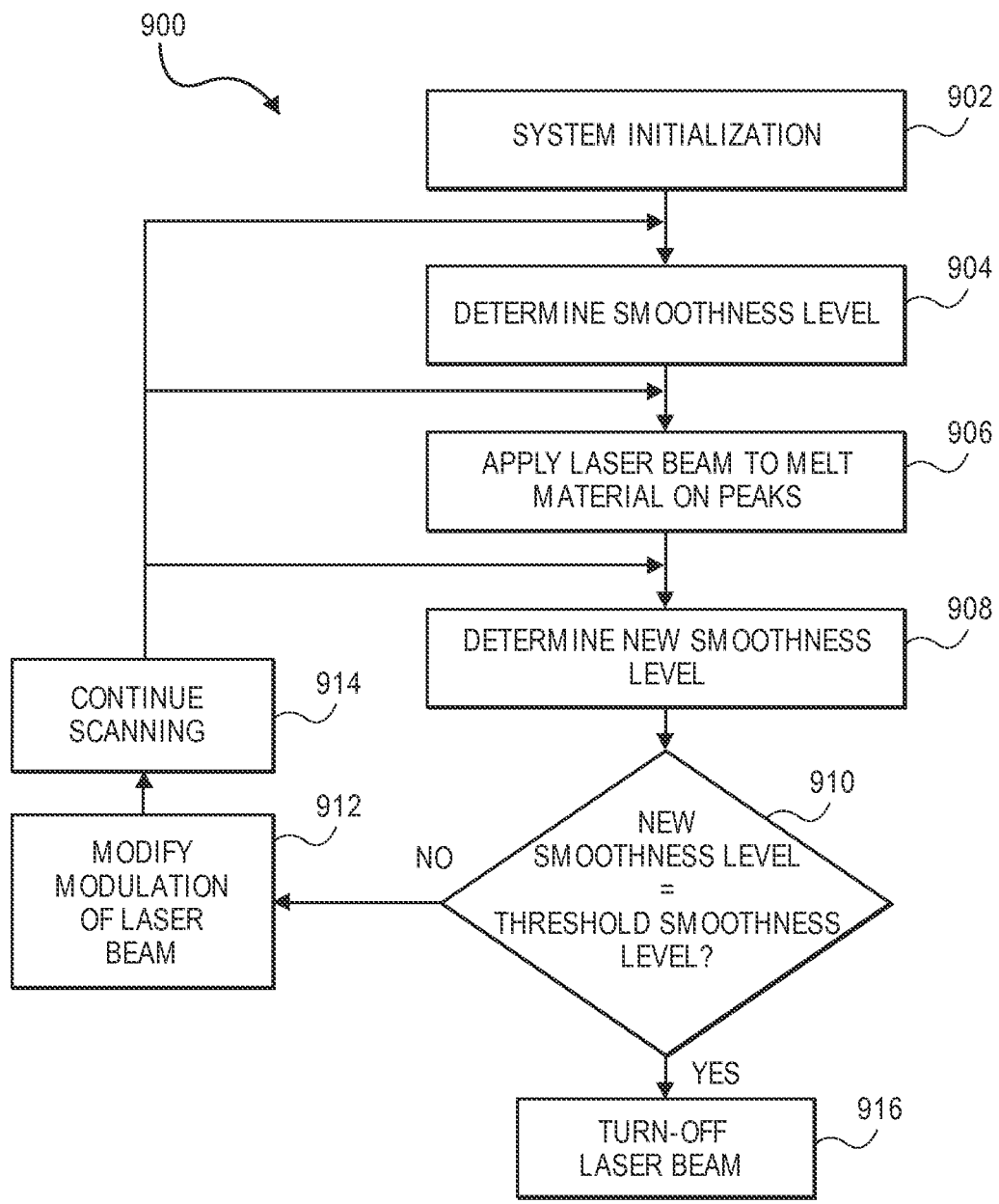
FIG. 9 illustrates a laser polishing method for the metal face seal of FIG. 1, in accordance with an aspect of this disclosure.

The processor 408 may be coupled to the memory 410 to access and execute computer readable instructions 804 (shown in FIG. 8) to implement various features and functionalities of operations 902-916 discussed with respect to FIG. 9. The memory 410 may be implemented as a non-transitory computer readable medium. By way of example only, the memory 410 may be a semiconductor based memory device including but not limited to random access memory (RAM), read only memory (ROM), Dynamic RAM, Programmable ROM, Electrically Erasable programmable ROM (EEPROM), Static RAM, Flash memory, combinations thereof, or other types of memory devices known to one of ordinary skill in the art. In one aspect, the memory 410 may also be part of a computing device or a CNC machine and may be co-located with the processor 408. In one aspect, the memory 410 may be made of or implemented using a non-transitory computer readable storage medium on which the computer executable instructions 804 reside. Such non-transitory computer readable storage medium may include semiconductor memory, optical memory, magnetic memory, mono- or bi-stable circuitry (flip-flops, etc.) and the like, or combinations thereof. Such non-transitory computer readable storage medium excludes signals that are transitory.

In one aspect of this disclosure, the imaging system 414 may be a sensor configured to obtain images of the seal face surface 102 at different instances in time. The imaging system 414 may be positioned at an appropriate distance or height above the seal face surface 102. Such positioning of the imaging system 414 may be before, during, or after treatment/polishing of the seal face surface 102 by the laser source 402. By way of example only and not by way of limitation, the imaging system 414 may be, or may include, a charge coupled device (CCD) or a CMOS imaging sensor. Alternatively, other types of detection and imaging techniques and devices may be employed to determine surface texture of the seal face surface 102, including but not limited to holography/stereo imaging techniques, infrared detection, implemented, for example using photodiodes or an array of photo-detectors. The images of the seal face surface 102 captured by the imaging system 414 may be provided to the processor 408 for image processing and may be stored in the memory 410. Such images may be utilized by the processor 408 to determine a percentage isotropy or a three-dimensional roughness of the seal face surface 102, as discussed with respect to FIGS. 6-10.

Figure 7:
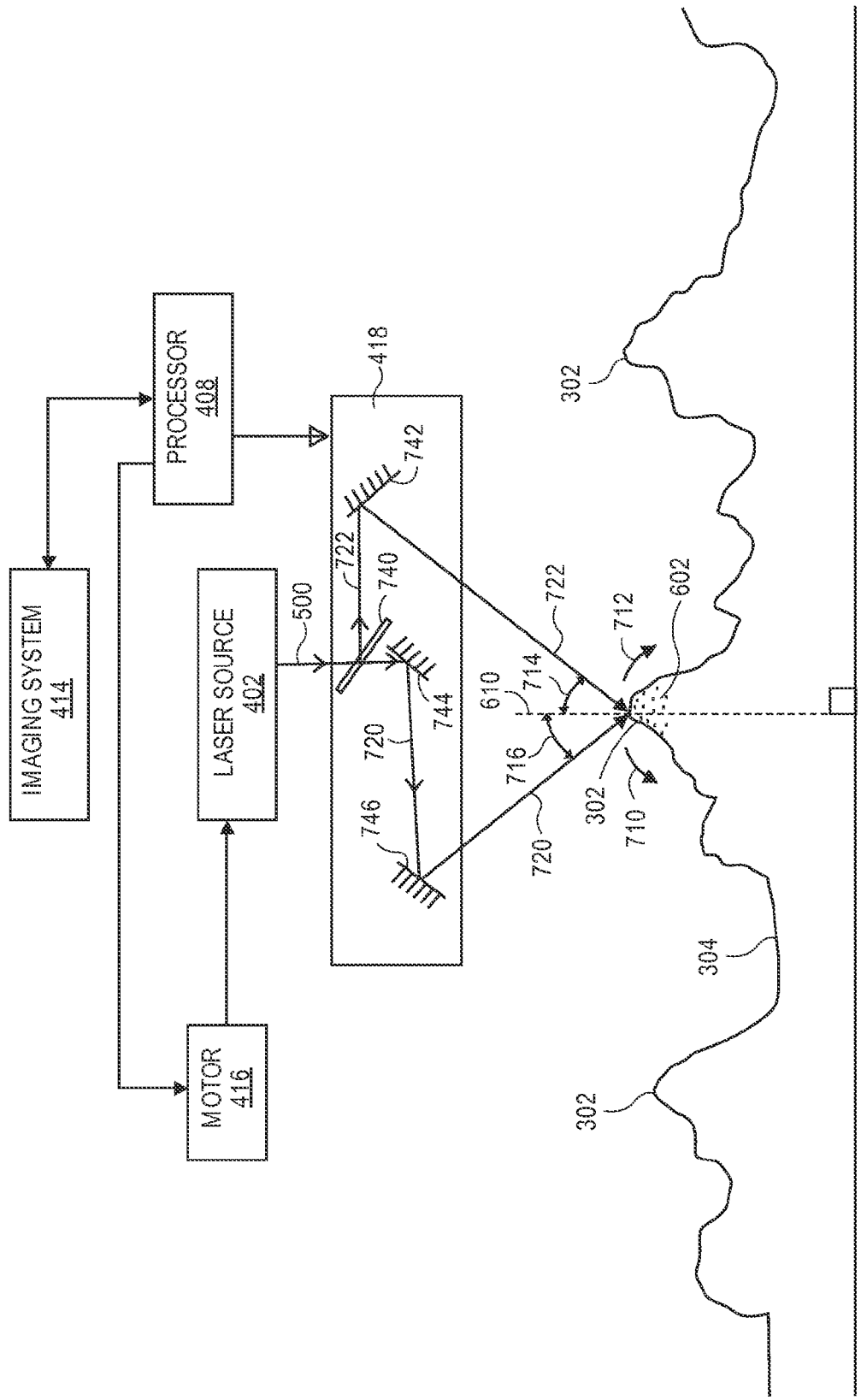
FIG. 7 illustrates two laser beams applied at different angles to the metal face seal of FIG. 1, in accordance with an aspect of this disclosure.

In one aspect of this disclosure, the optical system 418 may include a beam splitter 740, a first mirror 742, a second mirror 744, and a third mirror 746, as illustrated in FIG. 7. It will be appreciated by one of ordinary skill in the art in view of this disclosure that the optical system 418 may include additional optical and electro-optical components to direct and/or condition an output of the laser source 402 (e.g., the laser beam 500). Such components include, but are not limited to, collimators, lenses, polarizers, optical filters, gratings, additional mirrors, and the like, and/or combinations thereof. Further, the optical system 418 may be configured to condition and/or redirect reflections from the seal face surface 102 encountered during operation of the laser polishing system 400.

In one aspect of this disclosure, the shielding gas nozzle 420 may be used to direct an inert gas to a portion of the seal face surface 102. Such an inert gas removes debris and other particles from the seal face surface 102 prior to, during, and/or after use of the laser source 402 over the seal face surface 102. Further, the shielding gas nozzle 420 reduces/eliminates oxidation of a material of the seal face surface 102 when heated by providing a gas to displace oxygen in the region where the laser beam 500 is applied. In another aspect, the shielding gas nozzle 420 may be optional, for example, when no or very little material from the seal face surface 102 is dislodged.

It will be appreciated that the relative arrangement of various components of the laser polishing system 400 illustrated in FIGS. 4 and 5 are by way of example only and not by way of limitation. Further, parts of the laser polishing system 400 may be movable and programmable to adjust for spatial constrains, a size of the metal face seal 100, and or a final smoothness level desired for the metal face seal 100, based upon specific applications for which the metal face seal 100 is to be utilized.

Figure 6:
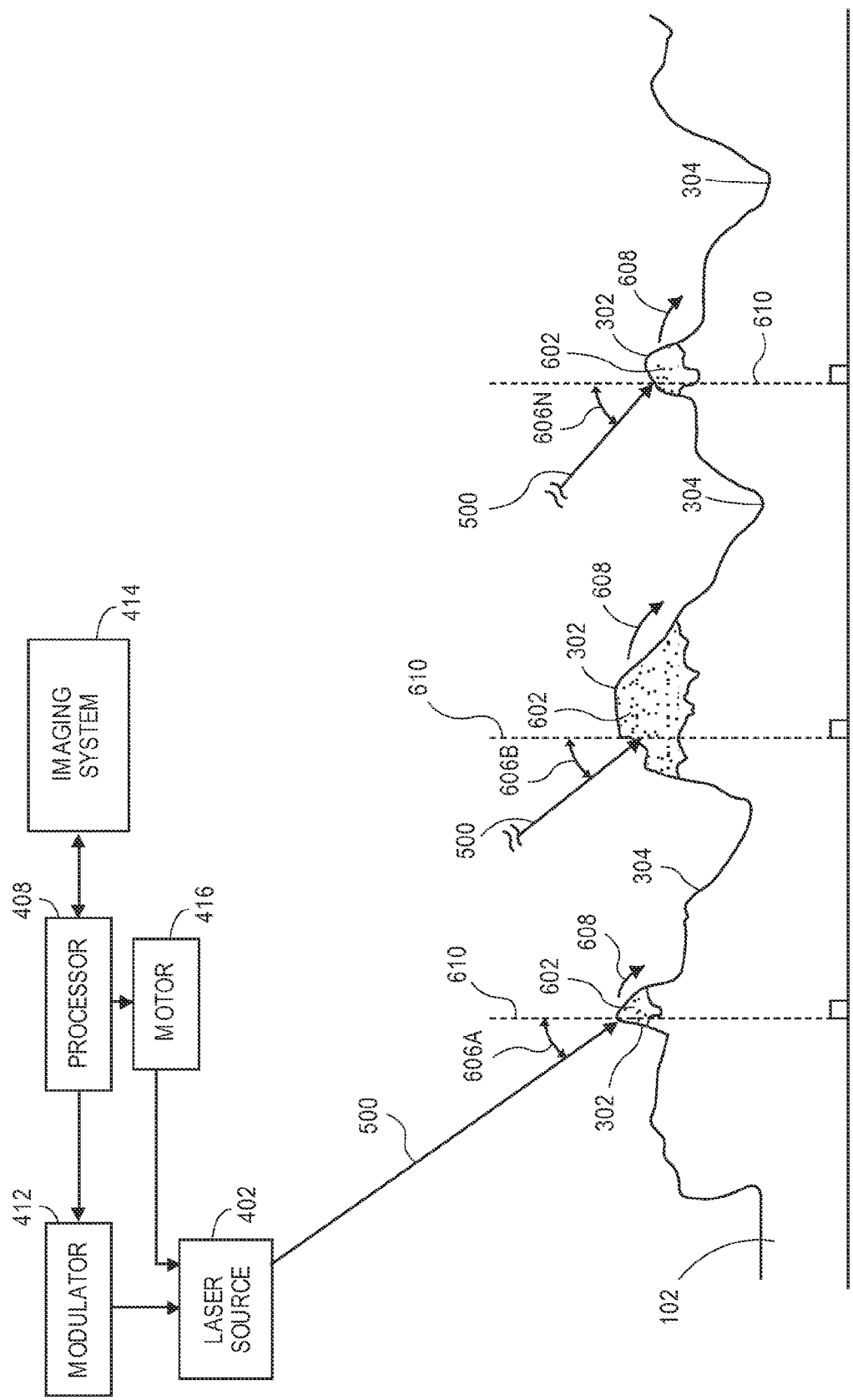
FIG. 6 illustrates a laser beam applied at an angle to the metal face seal of FIG. 1, in accordance with an aspect of this disclosure.

Referring to FIG. 6, the laser source 402 is illustrated to output the laser beam 500 to be incident on one or more of the plurality of peaks 302 on the seal face surface 102, in accordance with an aspect of this disclosure. The laser source 402 may be positioned to apply the laser beam 500 to one or more of the plurality of peaks 302 sequentially (at different time instants) or simultaneously (at the same time). The laser beam 500 has an amplitude or intensity level sufficient to create a melt or a partial melt 602 of/on one or more of the plurality of peaks 302. As the laser beam 500 is applied to the seal face surface 102, the heat generated by the laser beam 500 causes the melt or the partial melt 602 to flow into the plurality of valleys 304, as indicated by arrows 608, resulting in the seal face surface 102 becoming smoother. Due to such melting and/or flowing of the melt or the partial melt 602, the material of the seal face surface 102 is not wasted.

In one aspect, the laser source 402 is moved to a position by the motor 416 such that the laser beam 500 is at one or more of a plurality of angles 606A, 606B, . . . , 606N (where N is an integer from 1 to co). The number N of the plurality of angles 606A-606N may vary, for example, depending upon how smooth the seal face surface 102 is. For example, a high roughness of the seal face surface 102 includes a higher number of the plurality of peaks 302, whereas a low roughness of the seal face surface 102 includes a lower number of the plurality of peaks 302. Accordingly, when the roughness of the seal face surface 102 is high, a large number of the plurality of angles 606A-606N may exist, whereas when the roughness of the seal face surface 102 is low, a lower number of the plurality of angles 606A-606N may exist. The number N is therefore directly associated with a number of times or a number of copies of the laser beam 500 that may be applied or incident on the seal face surface 102. Furthermore, although FIG. 6 illustrates the plurality of angles 606A-606N as two dimensional, one of ordinary skill in the art reading this disclosure will appreciate that one or more of the plurality of angles 606A-606N are solid angles, measured respectively relative to a normal 610 to the seal face surface 102.

In one aspect, the plurality of angles 606A-606N may all be equal. Alternatively, at least one, or more than one, of the plurality of angles 606A-606N may be different from the remaining ones of the plurality of angles 606A-606N. In another aspect, a numerical value of each of the plurality of angles 606A-606N may depend upon a power level or the intensity level of the laser beam 500. For example, when one or more of the plurality of peaks 302 of the seal face surface 102 are subjected to ablation, the numerical value of a first angle (e.g., the angle 606A) of the plurality of angles 606A-606N may be substantially around 85°, or exactly equal to 85°, measured relative to the normal 610 to the seal face surface 102. In this example, the laser beam 500 is almost parallel to the seal face surface 102. In another example, when the laser beam 500 is applied to remelt one or more of the plurality of peaks 302, the numerical value of the first angle is substantially about 0°, or exactly equal to 0°, relative to the normal 610. Therefore, in this example, the laser beam 500 is perpendicularly, or substantially perpendicularly, incident on one or more of the plurality of peaks 302.

Further by way of example only and not by way of limitation, the laser beam 500 when applied substantially parallel to the seal face surface 102 (e.g., at 85°), there is a smaller loss of material of the seal face surface 102 as compared to higher angles or non-parallel orientations of the laser beam 500 with respect to the seal face surface 102. However, during an initial stage of application of the laser beam 500, a smaller angle (e.g., 0°) may be advantageous in creating a seed for the melt or the partial melt 602. In this respect, it will be appreciated by one of ordinary skill in the art in view of this disclosure that the numerical values of the plurality of angles 606A-606N may be varied between 0° to 90°. Such variations in the plurality of angles 606A-606N may be implemented by a precise control of the positioning of the laser source 402 by the processor 408, using the motor 416. The plurality of angles 606A-606N may be selected prior to during or after each application of the laser beam 500 by the processor 408. For example, the processor 408 may be provided images of the seal face surface 102 in real time as the laser polishing system 400 is being used to polish the seal face surface 102. The processor 408 may then be configured to control the laser source 402 to output the laser beam 500 at specific values of the plurality of angles 606A-606N based upon a smoothness of the seal face surface 102 as identifiable by the processor 408 in the images. Such control of the laser source 402 may be carried out by the processor 408 sending control signals to the motor 416 to tilt the laser source 402 in a manner such that the laser beam 500 is scanned through one or more of the plurality of angles 606A-606N, for example, in the range of 0° to 90° with respect to the normal 610.

Referring to FIG. 7, the laser source 402 is illustrated to output the laser beam 500 to be incident on one or more of the plurality of peaks 302 on the seal face surface 102 from two different directions, in accordance with an aspect of this disclosure. The laser beam 500 may be passed through the beam splitter 740 of the optical system 418 to result in a first laser beam 720 and a second laser beam 722. Each of the first laser beam 720 and the second laser beam 722 may be passed through one or more of the first mirror 742, the second mirror 744, and the third mirror 746, for example, as illustrated in FIG. 7. The first mirror 742, the second mirror 744, and the third mirror 746 may be controllable by the motor 416 and/or the processor 408. By way of example only and not by way of limitation, first mirror 742, the second mirror 744, and the third mirror 746 may be micromirrors in an array of mirrors controllable and addressable by the processor 408, or discrete individual mirror components known to one of ordinary skill in the art. Further one of ordinary skill in the art will appreciate in view of this disclosure that the first laser beam 720 and the second laser beam 722 may be directed through additional or lesser number of mirrors. Furthermore, the second laser beam 722 may be an additional laser beam, and the laser polishing system 400 may include at least one additional laser beam other than the first laser beam 720 or the laser beam 500.

The first laser beam 720 and the second laser beam 722 may exit the optical system 418 at two different angles 716 and 714 relative to the normal 610. The first laser beam 720 and the second laser beam 722 may be output to avoid interference fringes, for example, by maintaining appropriate spacing between the first laser beam 720 and the second laser beam 722. In one aspect, the angle 716 may be equal to one of the plurality of angles 606A-606N (e.g., the first angle 606A) illustrated in FIG. 6. Further, the angle 714 may be a negative of the angle 714 and may be a second angle at which the laser beam 500 may be delivered to one of the plurality of peaks 302 as the second laser beam 722. For example, the angle 714 may be equal to 85° and the angle 716 may be equal to −85° relative to the normal 610. Accordingly, the first laser beam 720 and the second laser beam 722 may cause the melt or the partial melt 602 to run off or flow towards respective ones of the plurality of valleys 304 each surrounding one of the plurality of peaks 302 on which the first laser beam 720 and the second laser beam 722 are incident, as indicated by arrows 710 and 712 in FIG. 7. Again, it will be appreciated that the angles 716 and 714 are solid angles as the first laser beam 720 and the second laser beam 722 are each applied on and/or around one or more of the plurality of peaks 302. Furthermore, although only one of the plurality of peaks 302 is illustrated in FIG. 7 as receiving the laser beam 500 (as the first laser beam 720 and the second laser beam 722), the first laser beam 720 and the second laser beam 722 may be applied to more than one of the plurality of peaks 302, simultaneously or at different time instances.

In an alternative aspect, the first laser beam 720 and the second laser beam 722 may be generated from two separate lasers (not shown) within the laser source 402 or independently outside. The angles 716 and 714 of such two separate lasers may be controlled by the processor 408 in a manner similar to that for the laser source 402, as will be appreciated by one of ordinary skill in the art in view of this disclosure.

Referring to FIG. 8, the memory 410 including a smoothness level map 802 is illustrated, in accordance with an aspect of this disclosure. The smoothness level map 802 is a representation or mapping of a portion of or an entirety of the seal face surface 102 with respect to a smoothness (or inversely, a roughness) thereof. For example, the smoothness level map 802 is an M×N matrix in which each of elements $802_{MN}$ is a count of a number of the plurality of peaks 302 in an $(M, N)^{th}$ region of the seal face surface 102 (with M≥1, N≥1). The smoothness level map 802 may have a fixed or a variable granularity as M, N may be programmable for different types of metal face seals, as well as for the same metal face seal 100 based on how the smoothness of the metal face seal 100 varies during laser polishing thereof by the laser polishing system 400. For example, during an initial operation of the laser polishing system 400 when the seal face surface 102 is rough, the smoothness level map 802 may be a larger matrix, and later when the seal face surface 102 has lesser roughness, the smoothness level map 802 may become a smaller matrix with a lower number of the elements $802_{MN}$. Therefore, the number of elements $802_{MN}$ may decrease as the seal face surface 102 is polished and smoothed using the laser polishing system 400.

In one aspect, the smoothness level map 802 may be initially generated by the processor 408 based upon one or more images of the seal face surface 102 provided to the processor 408 by the imaging system 414. In an alternative aspect, the processor 408 may generate the smoothness level map 802 based upon a return time of the laser beam 500 from the plurality of peaks 302 and/or the plurality of valleys 304, as discussed with respect to FIGS. 9-10. For example, instead of using a number of the plurality of peaks 302 and the plurality of valleys 304 on the seal face surface 102 as a criterion for determining smoothness from the smoothness level map 802, the processor 408 may be configured to calculate a height/depth 1002 (shown in FIG. 10) as an indicator of smoothness of the different portions of the seal face surface 102. The plurality of angles 606A-606N may be in correlation with the smoothness level map 802 and may be varied as the seal face surface 102 gets smoother.

In yet another aspect of this disclosure, the smoothness level map 802 may be a three-dimensional measure of the smoothness (or, roughness) of the seal face surface 102. For example, using the laser beam 500 of the laser source 402 scanned transversally over the seal face surface 102 in the radial direction 510, the processor 408 may determine contours or contour lines for each portion of the seal face surface 102 and store the contours as values represented by the elements $802_{MN}$ in the smoothness level map 802. For highly rough portions of the seal face surface 102, a large number of such contour lines may exist in the respective ones of the elements $802_{MN}$ in the smoothness level map 802, whereas for smoother portions, a lower number of lines may be stored in the respective one of the elements $802_{MN}$. Eventually, such contours may converge for all the elements $802_{MN}$ as the seal face surface 102 attains a final smoothness level indicated by a threshold smoothness level 806.

The threshold smoothness level 806 includes a smoothness level that each of the elements $802_{MN}$ may attain finally upon polishing of the seal face surface 102 iteratively by the laser polishing system 400. Since the threshold smoothness level 806 is same for all the elements $802_{MN}$, the seal face surface 102 upon polishing by the laser polishing system 400 has isotropic or non-circumferential polishing that is uniform all over the seal face surface 102. Such isotropic polishing is in contrast with conventional laser etching systems that are circumferential or directional in smoothness levels, and have grooves/patterns to ensure such directionality.

INDUSTRIAL APPLICABILITY

The present disclosure is applicable to metal face seals, and more particularly, to the laser polishing system 400 and a laser polishing method 900 for the metal face seal 100.

Metal face seals have a ring like shape. Conventionally, metal face seals are polished manually and mechanically with a goal to provide a smooth surface (similar to a bearing). Current processes to achieve this goal include a lapping process followed by a manual or mechanical polishing process. At the end of such conventional processes, the metal face seals tend to have a circumferential or directional smoothness with substantial variability in smoothness within a single metal face seal, as well as inconsistency in a desired level of smoothness from one seal to another. Further, such circumferentiality may lead to asymmetric degradation in smoothness as the metal face seal is used in a machine, causing leaks in one direction, and suffers from other drawbacks, such as such as inconsistent and directional polishing of the ring surface, especially with respect to metal face seal applications. Furthermore, the mechanical polishing leads to a substantial loss of material of the metal face seal.

Various aspects of this disclosure address the complex problem of achieving uniform isotropic smoothness in metal face seals for a consistent finish with a high bearing ratio and improved speed and/or load capabilities of the metal face seal 100, as well as an improved "lay" or final texture of the seal face surface 102.

Referring to FIG. 9, there is illustrated the laser polishing method 900 for the metal face seal 100, in accordance with an aspect of this disclosure. FIG. 9 presents the laser polishing method 900 as a flow diagram, although the laser polishing method 900 may be understood using other types of presentations such as process diagrams, graphs, charts, equations, etc. In one aspect, one or more processes or operations in the laser polishing method 900 may be carried out by the processor 408, using various inputs and/or signals from the imaging system 414, and by executing the computer executable instructions 804 stored in the memory 410.

In another aspect, in the laser polishing method 900, one or more processes or operations, or sub-processes thereof, may be skipped or combined as a single process or operation, and a flow of processes or operations in the laser polishing method 900 may be in any order not limited by the specific order illustrated in FIG. 9. For example, one or more processes or operations may be moved around in terms of their respective orders, or may be carried out in parallel. The term "flow," as used with respect to FIG. 9, generally refers to a logical progression of operations in an exemplary manner carried out by the processor 408. However, such a flow is by way of example only and not by way of limitation, as at a time, the flow may proceed along multiple operations or processes of the laser polishing method 900. Further, the laser polishing method 900 may be carried out by the processor 408 for various sizes and various materials of metal face seals and is not limited to the metal face seal 100. The laser polishing method 900 may be implemented by the processor 408 in a high level or a low level programming language (e.g., C++, assembly language, etc.) using logic circuitry and by executing the computer executable instructions 804 in the memory 410. Furthermore, it will be appreciated that the discussion herein is equally applicable to the laser beam 500 as well as to the first laser beam 720 and the second laser beam 722 without departing from the scope of this disclosure.

The laser polishing method 900 may begin in an operation 902 where the laser polishing system 400 is initialized. The initialization of the laser polishing system 400 may include obtaining electronically one or more images of the seal face surface 102 using the imaging system 414 and storing the images in the memory 410. The initialization may include positioning the laser source 402 above the seal face surface 102 such that the laser beam 500 is incident only upon the seal face surface 102 and not elsewhere. In one aspect, the initialization of the laser polishing system 400 includes selecting output power levels of the laser source 402 and configuring the modulator 412 to implement a modulation scheme for the laser source 402. The selection of the output power level and modulation scheme may be performed by the processor 408 based upon, for example, a size of the metal face seal 100 and an initial roughness of the seal face surface 102. Further, a pre-inspection of the metal face seal 100 may be carried out in the operation 902 for selecting different polishing conditions, e.g., for determining the threshold smoothness level 806. Such pre-inspection may be carried out using isotropy techniques implemented using the imaging system 414, for example.

In another aspect, the initialization of the laser polishing system 400 may include moving or tilting the laser source 402 to one of the plurality of angles 606A-606N. For example, the laser source 402 may be tilted by the motor 416 to the angle 606A. Alternatively, once the laser source 402 has been initialized in the operation 902, the laser beam 500 may be made incident on the seal face surface 102 at one of the plurality of angles 606A-606N using external optical components. For example, the laser beam 500 may be initially incident upon the seal face surface 102 at the angle 606A by passing the laser beam 500 through the optical system 418.

In yet another aspect, the initialization of the laser polishing system 400 may include the processor 408 determining a rotation speed of the rotatable base 404 for rotating the metal face seal 100 at a predefined speed during laser polishing of the metal face seal 100 (e.g., in an operation 906 when the laser beam 500 is applied to the seal face surface 102). The rotation speed may be selected depending upon the dimensions and/or material of the metal face seal 100. The processor 408 may select the rotation speed as a relative rotation speed of the rotatable base 404 relative to the laser source 402, or an absolute rotation speed. For example, when the laser source 402 is stationary, the rotatable base 404 may be rotated at an angular speed and the laser beam 500 applied. Alternatively, the metal face seal 100 may be stationary and laser source 402 may be moved over the seal face surface 102 to carry out the laser polishing method 900. Still alternatively, the laser source 402 and the metal face seal 100 may both be rotated, at the same time, or at different times. For example, for large values of the radius of the metal face seal 100, the laser source 402 may be moved in a scanning motion, and vice-versa for smaller radius values of the radius of the metal face seal 100. Furthermore, the rotation of the laser source 402 as well as the rotatable base 404 (and hence, the metal face seal 100) may be controlled or stopped, e.g., to determine a current level of smoothness, or for other reasons, by the processor 408.

In an operation 904, the processor 408 determines an initial or a first smoothness level of the seal face surface 102. The smoothness level may be determined using various amplitude, curve, slope, aereal, counting, and/or profile roughness parameters, as known to one of ordinary skill in the art. Such parameters may be determined as part of a laser interferometry technique in which a plurality of wavelengths may be output from the laser source 402 or a different laser, a white light interferometry technique, a surface interferometry technique, and the like, or combinations thereof. For example, the initial smoothness level may be an average of 0.08 μm of the seal face surface 102, which is considered as a high degree of roughness or low degree of smoothness.

Figure 10:
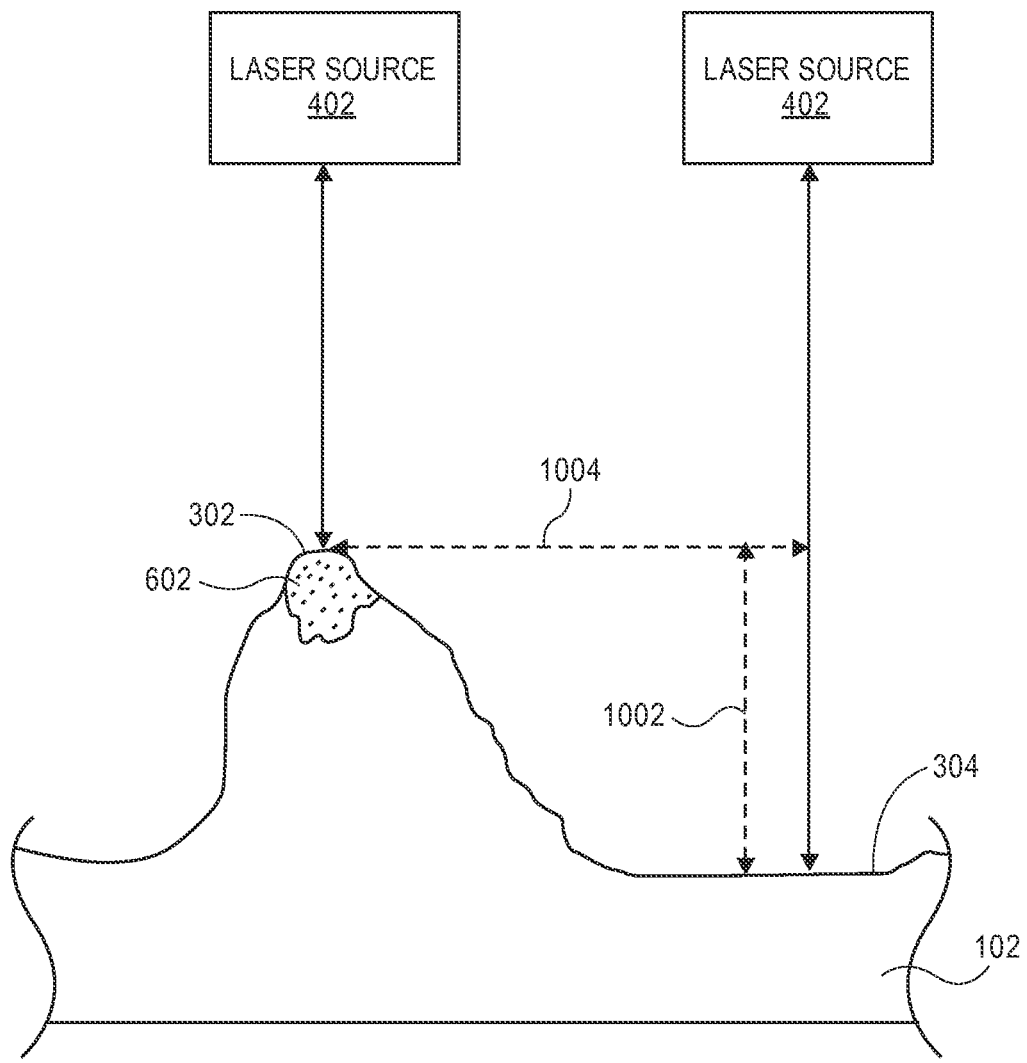
FIG. 10 illustrates an exemplary setup for determining smoothness of the metal face seal of FIG. 1 during the laser polishing method of FIG. 9, in accordance with an aspect of this disclosure.

The initial smoothness level may be determined by the processor 408 using the smoothness level map 802 stored in the memory 410 based on the images provided by the imaging system 414. The initial smoothness level of the seal face surface 102 may be determined for each portion of the seal face surface 102. In one aspect, the laser source 402 may determine the initial smoothness level by applying the laser beam 500 at a low power level normal to a top most point of one or more of the plurality of peaks 302, as illustrated in FIG. 10. The processor 408 may then determine the height/depth 1002 of each of the plurality of peaks 302. The height/depth 1002 may be determined by initially determining a first time duration that it takes the laser beam 500 to reach the top most surface of each of the plurality of peaks 302. The laser source 402 may then be moved by a distance 1004 to the valley 304 adjacent to the peak 302. The processor 408 may then determine a second time duration it takes the laser beam 500 to reach a bottom of the valley 304. A difference between the two time durations is multiplied by a speed of the laser beam 500 (e.g., equal to a speed of light in air or other medium between the laser source 402 and the seal face surface 102) to obtain the height/depth 1002. Since the laser source 402 has a femtosecond (fs) scale output, the height/depth 1002 may be determined for very small gaps between the plurality of peaks 302 and the plurality of valleys 304. For example, for a pulse of 1 fs, the smallest value of the height/depth 1002 that may be resolvable by the processor 408 may be equal to speed of light (c) multiplied by 1 fs (or $10^{-15}$ s), which is equal to about 0.3 nm.

A plurality of values for the height/depth 1002 may be then used as a parameter for the smoothness level map 802 to determine the initial smoothness of the seal face surface 102. In between or after applying the laser beam 500 between two different ones of the plurality of peaks 302 and the plurality of valleys 304 to determine the height/depth 1002, the processor 408 may send a signal to the imaging system 414 to take one or more images to update the smoothness level map 802. The processor 408 may execute image processing algorithms implemented using the computer executable instructions 804 to update the elements $802_{MN}$ of the smoothness level map 802. For example, various Fourier transform, wavelet transform, or other types of frequency and scale based image analysis techniques may be applied by the processor 408 on the images provided by the imaging system 414 to generate or update the smoothness level map 802 for the seal face surface 102.

In the operation 906, the laser beam 500 is applied to one or more of the plurality of peaks 302. As discussed, the laser beam 500 may be in the form of femtosecond pulses. Due to the short time scale of such femtosecond pulses, the laser source 402 is able to determine the smoothness level of the seal face surface 102 at a very fine granularity level. The laser beam 500 may be controlled by the processor 408, for example, via the modulator 412. For example, the modulator 412 may, upon receiving control signals from the processor 408, turn on and off the laser beam 500 to generate the femtosecond scale pulses. The application of the laser beam 500 may be carried out in one or more of the plurality of angles 606A-606N. In one aspect, the laser beam 500 may be applied to create the melt or the partial melt 602 of the material of the seal face surface 102 at an angle of 0° relative to the normal 610. In another aspect, the melt or the partial melt 602 may be the result of an ablation of the plurality of peaks 302 when the laser beam 500 is applied substantially parallel to the seal face surface 102, for example, at an angle of 85° relative to the normal 610. In this respect, it will be appreciated that the application of the laser beam 500 in the operation 906 is for polishing the seal face surface 102 of the metal face seal 100 by having the melt or the partial melt 602 flow into the plurality of valleys 304. An exemplary advantage of applying the laser beam 500 at one or more of the plurality of angles 606A-606N that are substantially parallel to the seal face surface 102 is that the melt or the partial melt 602 of the material of the seal face surface 102 can flow in a direction in a controlled manner resulting in a non-circumferential polish of the seal face surface 102. Such laser polishing of the seal face surface 102 is different from conventional laser etching of metal face seals in which grooves or patterns may be created on the seal face surface 102 and the angle of incidence of the laser beam 500 is not a factor affecting such laser etching. Yet another exemplary advantage of applying the laser beam 500 to create the melt or the partial melt 602 is that the material properties of the seal face surface 102, for example, hardness and corrosion, may be modified. For example, when iron based alloys are used to make the metal face seal 100, an amorphous phase may be generated on the seal face surface 102 as part of the melt or the partial melt 602. Such an amorphous phase may aid in create additional polishing of the seal face surface 102, e.g., when exposed to an ultrafast excimer laser radiation in the form of the laser beam 500. The melt or the partial melt 602 having the amorphous phase may flow to the plurality of valleys 304 and form a molten pool of material that undergoes convectional heat transfer to cool and smoothen the seal face surface 102. The power level and speed of application of the laser beam 500 to create the melt or the partial melt 602 may be varied according to a degree to which the melt or the partial melt 602 has the amorphous phase.

In yet another aspect of this disclosure, using the processor 408, the laser beam 500 is applied transversally from an inside portion of the seal face surface 102 to an outside portion of the seal face surface 102 in the radial direction 510 corresponding to a radius or a diameter of the metal face seal 100, or vice-versa, from the outside portion to the inside portion. Applying the laser beam 500 transversally at one or more of the plurality of angles 606A-606N results in a non-circumferential or isotropic smoothness of the seal face surface 102. As the laser beam 500 is being applied, the shielding gas nozzle 420 may be used to direct a flow of the melt or the partial melt 602 from the plurality of peaks 302 into one or more of the plurality of valleys 304 respectively adjacent to the plurality of peaks 302. Alternatively, the shielding gas nozzle 420 may be applied after the laser polishing method 900 has been applied to remove any debris from the seal face surface 102. A power level of the laser beam 500 may be dependent upon how fast the laser polishing system 400 is programmed to polish the metal face seal 500. For example, for polishing a higher number of metal face seals in a given period of time, the laser source 402 may output the laser beam 500 at a higher power (e.g., over 100 W) as compared to a slower operating mode of the laser polishing system 400 in which the laser source 40 may out put the laser beam 500 at a lower power. Further, the power level of the laser source 402 may depend upon the specific applications in which the metal face seal 100 is used or designed for.

In still another aspect of this disclosure, the laser beam 500 may be applied after passing through the beam splitter 740 resulting in the first laser beam 720 and the second laser beam 722 being incident of the seal face surface 102. In this aspect, the plurality of peaks 302 are melted from more than one side. For example, the first laser beam 720 and the second laser beam 722 may be applied at the two different angles 714 and 716, although the two different angles 714 and 716 may have the same absolute value but opposite signs. For example, the angle 714 may be equal to 85° and the angle 716 may be equal to −85° relative to the normal 610. An exemplary advantage of applying the laser beam 500 on two different parts of one or more of the plurality of peaks 302 is that the melt or the partial melt 602 is created faster increasing an overall speed of execution of the laser polishing method 900 of the seal face surface 102. Another exemplary advantage of applying the laser beam 500 on two different parts of one or more of the plurality of peaks 302 is that the melt or the partial melt 602 may flow smoothly into the plurality of valleys 304 adjacent respectively to the plurality of peaks 302. During the operation 906, the processor 408 may continuously instruct the imaging system 414 to obtain images of the seal face surface 102 as the seal face surface 102 is being polished due to melting of the plurality of peaks 302 by the laser beam 500. In one aspect, it will be appreciated in view of this disclosure that applying the laser beam 500 may include burning of some material of the seal face surface 102 to smoothen or polish the seal face surface 102.

In an operation 908, the processor 408 may determine a second smoothness level of the seal face surface 102. The second smoothness level may be determined after the laser source 402 has scanned over an entirety of the seal face surface 102, or after the laser source 402 has scanned over a portion of the seal face surface 102, or both. In one aspect, the determination of the second smoothness level may be carried out in a manner similar to that for determining the first smoothness level in the operation 904. For example, after the operation 906 has been carried out, one or more of the plurality of peaks 302 may have melted or partially melted into respective ones of the plurality of valleys 304. Therefore, the height/depth 1002 for one or more of the plurality of peaks 302 may have changed (reduced or vanished). After the operation 906, the laser source 402 may be brought back into the positions shown in FIG. 10 to determine a new value for the height/depth 1002. Each of the elements $802_{MN}$ for the smoothness level map 802 may then be updated according to the new value of the height/depth 1002 for portions of or an entirety of the seal face surface 102. The new values of the elements $802_{MN}$ may then indicate the new smoothness level of the processor 408.

In an alternative aspect, the second smoothness level may be determined by the processor 408 by processing the images from the imaging system 414 stored in the memory 410. The processor 408 may obtain two-dimensional image slices of the seal face surface 102 to determine the second smoothness level. Each of the elements $802_{MN}$ may then be updated according to the second smoothness level, either for the entirety of the seal face surface 102 or for portions thereof. For example, the laser beam 500 may be applied almost parallel or substantially parallel to the seal face surface 102 (e.g., when the angle 606A≥85°). The processor 408 may then capture how the laser beam 500 is diffracted or scattered to obtain a two-dimensional map of the seal face surface 102. Such a two-dimensional map may be a part of the smoothness level map 802. As the laser polishing is applied to the seal face surface 102, the laser beam 500 applied almost parallel to the seal face surface 102 will incur lesser and lesser diffraction or scattering since the seal face surface 102 will get smoother and smoother. Accordingly, for every iteration of the operations 904-908, the second smoothness level may be determined by the processor 408, and the smoothness level map 802 be updated by the processor 408 depending upon a measure of scattering or diffraction of the laser beam 500. The diffraction and/or scattering of the laser beam 500 may be measured by the imaging system 414, for example, using CCD sensors, CMOS imaging sensors, gratings, and the like, or combinations thereof, as will be appreciated by one of ordinary skill in the art in view of this disclosure. Similar diffraction techniques may be applied to determine an initial or the first smoothness level, e.g., in the operation 904.

In an operation 910, the processor 408 determines if the second smoothness level determined in the operation 908, for the portions of or for the entirety of the seal face surface 102 match the threshold smoothness level 806. For example, the processor 408 may compare the smoothness levels stored in each of the elements $802_{MN}$ with the threshold smoothness level 806. If the second smoothness level is equal to the threshold smoothness level 806, the flow proceeds to an operation 910. If the second smoothness level is different from the threshold smoothness level 806, the flow proceeds to an operation 912. The processor 408 may make the decision in the operation 910 either at regular intervals based upon the laser polishing method 900 being applied to a specific portion of the seal face surface 102, or as and when needed, for example, after the seal face surface 102 has been polished once using the laser beam 500. Further, a time instant at which the processor 408 makes a determination regarding whether or not the current smoothness level (e.g., the second smoothness level) matches the threshold smoothness level 806 may be programmable by a user of the laser polishing system 400, and may vary from one metal face seal to the other.

In the operation 912, the processor 408 may modulate the laser source 402 based upon the measurement of the second smoothness level in the operation 908. The processor 408 may control the modulation of the laser source 402, the processor 408 may send electrical signals to the modulator 412. The modulator 412 may be controlled by the processor 408 to reduce or increase one or more physical characteristics of the laser beam 500 outputted by the laser source 402 depending upon the current smoothness level of the seal face surface 102. Such physical parameters may include, but are not limited to, an output power, an output frequency, a pulse-width, an angle of incidence, a phase, a beam shape, a polarization, a time period, a bias-level, and the like, or combinations thereof, of the laser beam 500. In one aspect, the modulator 412 may continue to provide the same modulation as was provided initially, e.g., during the operation 906 applied for the first time on the seal face surface 102. Such modulation may be a direct injection type modulation, or an external modulation of the laser beam 500, or both. In another aspect, the modulator 412 may be turned off and no modulation may be applied to the laser beam 500 using the processor 408. In yet another aspect, the modulator 412 may change one or more of the plurality of angles 606A-606N, in response to the determination carried out in the operation 910.

In an operation 914, the laser beam 500 may be controlled by the processor 408 to continue transversal scanning of the seal face surface 102. Subsequent to instructions or signals received from the processor 408, the laser source 402 may apply the laser beam 500 again to the seal face surface 102 to perform the operations 904-910. In one aspect, the operation 914 may be carried out as part of the determination of the smoothness levels of the various portions of the seal face surface 102 (e.g., in the operations 904 and 908). Alternatively, the scanning in the operation 914 may be carried out to determine portions of the seal face surface 102 to which the laser beam 500 is to be applied (e.g., in the operation 906). In yet another aspect, the scanning carried out in the operation 914 may be performed to determine inner and outer radial boundaries of the seal face surface 102 such that the laser source 402 may be tilted to a desired one of the plurality of angles 606A-606N and positioned accordingly. Further, the transversal scanning of the laser beam 500 may be carried out in any direction, e.g., inside to outside, or outside to inside along the radial direction 510.

In the operation 916, the processor 408 may control the laser source 402, for example, by turning off the laser source 402, and hence, the laser beam 500, when the processor 408 determines that the smoothness level of the seal face surface 102 is equal to the threshold smoothness level 806. In one aspect, the laser source 402 and/or the metal face seal 100 may be moved away from each other such that no further remelting or ablation of the seal face surface 102 occurs. In another aspect, the laser source 402 may not be fully turned off. Instead, the laser source 402 may be programmed to output a low power beam that does not physically alter the metal face seal 100 further. An example advantage of such partial turning off of the laser source 402 is that the laser source 402 is at an appropriate bias level ready to be used for laser polishing of another metal face seal without a turn-on delay of the laser source 402. As a result, a whole batch of seals may be laser polished in a fast sequence of the operations 904-916, skipping the initialization in the operation 902. The turning off, partially or fully, of the laser source 402, may occur once the processor 408 determines that the seal face surface 102 is isotropically smooth or has substantially the same smoothness in all directions. The laser polishing method 900 may be applied to achieve a final average level of smoothness substantially lower than an initial average level of smoothness (e.g., 0.08 µm). Once a final smoothness level of the seal face surface 102 has been attained and the laser source 402 has been turned off by the processor 408, the shielding gas nozzle 420 may be applied to the seal face surface 102 to blow off any debris resulting from the laser polishing method 900. The final smoothness level may depend upon specific applications in which the metal face seal 100 is used. For example, the final smoothness level may be less than 0.08 µm and may be programmable by the processor 408.

Therefore, various aspects of this disclosure advantageously provide consistent laser polishing of the metal face seal 100 using the laser polishing system 400. Due to the isotropic and non-circumferential polishing using the laser beam 500 incident at one or more of the plurality of angles 606A-606N, the metal face seal 100 after being polished does not have asymmetric or erratic smoothness. This may lead to a more consistent sealing and leakage prevention of fluids that are sealed off in the machines where the metal face seal 100 is deployed. Further, control of the laser beam 500 at precise values of the plurality of angles 606A-606N using the processor 408 makes the laser polishing method 900 repeatable for consistent smoothness levels across a plurality of metal face seals (including the metal face seal 100). Depending upon the specific applications in which the metal face seal 100 is polished using the laser polishing method 900 and the laser polishing system 400, a reduction in the roughness of the metal face seal 100 by a factor of ten, for example, may be achieved. Furthermore, the laser polishing method 900 may be repeated as necessary to achieve a desired smoothness level (e.g., the threshold smoothness level 806).

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

What is claimed is:

1. A laser polishing method for a metal face seal, comprising:
    determining, using a processor, a first smoothness level of a seal face surface of the metal face seal;
    applying, using the processor, a laser beam at a first angle to at least one peak on the seal face surface of the metal face seal, the first angle measured relative to a normal to the seal face surface;
    determining, using the processor, a second smoothness level of the seal face surface;
    controlling, using the processor, the laser beam until the second smoothness level is equal to a threshold smoothness level; and
    turning off the laser beam, using the processor, when the second smoothness level is equal to the threshold smoothness level isotropically over the seal face surface.

2. The laser polishing method of claim 1, wherein the applying is performed by moving the laser beam transversally along a radial direction of the metal face seal for polishing the seal face surface isotropically.

3. The laser polishing method of claim 2, wherein the applying is performed by moving a laser producing the laser beam relative to the metal face seal while the laser beam is moved transversally.

4. The laser polishing method of claim 1, wherein the laser beam is incident perpendicularly on the at least one peak of the seal face surface.

5. The laser polishing method of claim 1, wherein the laser beam is applied substantially parallel to the seal face surface.

6. The laser polishing method of claim 5, wherein the first angle is equal to 85° with respect to the normal.

7. The laser polishing method of claim 1, wherein the applying includes melting at least a portion of the at least one peak into at least one valley adjacent to the at least one peak on the seal face surface.

8. The laser polishing method of claim 1, further comprising:
    applying, using the processor, at least one additional laser beam at a second angle, different from the first angle.

9. The laser polishing method of claim 8, wherein the second angle is a negative of the first angle with respect to the normal to the seal face surface.

10. The laser polishing method of claim 1, wherein the determining the first smoothness level and the determining the second smoothness levels are carried out by measuring an isotropy of the seal face surface.

11. The laser polishing method of claim 1 further comprising:
    scanning the seal face surface transversally using the laser beam, the scanning being controlled by the processor;
    comparing, at the processor, the second smoothness level with the threshold smoothness level stored in a smoothness level map; and
    modulating, using the processor, a laser producing the laser beam according to the comparing.

12. A laser polishing system for a metal face seal, comprising:
    a metal face seal positioned on a rotatable base;
    a laser source configured to apply a laser beam at a first angle to at least one peak on a seal face surface of the metal face seal, the first angle measured relative to a normal to the seal face surface; and
    a processor configured to:
        determine a first smoothness level of the seal face surface,
        determine a second smoothness level of the seal face surface after the laser beam has been applied to the seal face surface,
        control the laser beam until the second smoothness level is equal to a threshold smoothness level; and
        turning off the laser beam when the second smoothness level is isotropically equal to the threshold smoothness level over the seal face surface.

13. The laser polishing system of claim 12, wherein the laser source is movable along the seal face surface.

14. The laser polishing system of claim 12, wherein the laser beam is applied substantially parallel to the seal face surface.

15. The laser polishing system of claim 14, wherein the first angle is equal to 85° with respect to the normal.

16. The laser polishing system of claim 12, further comprising:
    an optical system configured to generate an additional laser beam from the laser source to apply to the peak at a second angle, different from the first angle.

17. The laser polishing system of claim 12, further comprising:
    a memory coupled to the processor, the memory including a smoothness level map for comparison to the threshold smoothness level of the seal face surface.

18. The laser polishing system of claim 12, wherein the metal face seal is a DUO-CONE™ seal.

19. The laser polishing system of claim 12 further comprising:
    a modulator coupled to the processor and configured to modulate the laser beam based upon the second smoothness level.

20. A non-transitory computer readable medium comprising computer executable instructions for laser polishing of a metal face seal, the computer executable instructions when executed by a processor cause the processor to:
    determine a first smoothness level of a seal face surface of the metal face seal;
    apply a laser beam at a first angle to at least one peak on the seal face surface of the metal face seal, the first angle measured relative to a normal to the seal face surface;
    determine a second smoothness level of the seal face surface;
    control the laser beam until the second smoothness level is equal to a threshold smoothness level; and turn off the laser beam when the second smoothness level is equal to the threshold smoothness level isotropically over the seal face surface.

* * * * *